(12) United States Patent
Sakura et al.

(10) Patent No.: US 7,713,156 B2
(45) Date of Patent: *May 11, 2010

(54) CHAIN TRANSMISSION DEVICE

(75) Inventors: Shunji Sakura, Osaka (JP); Akira Hirai, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 55 days.

This patent is subject to a terminal disclaimer.

(21) Appl. No.: 11/999,450

(22) Filed: Dec. 5, 2007

(65) Prior Publication Data

US 2008/0176688 A1    Jul. 24, 2008

(30) Foreign Application Priority Data

Jan. 24, 2007    (JP) .............................. 2007-014311

(51) Int. Cl.
*F16H 7/06*    (2006.01)
(52) U.S. Cl. ....................... 474/161; 474/156
(58) Field of Classification Search ................ 474/151, 474/155, 156, 161, 162
See application file for complete search history.

(56) References Cited

U.S. PATENT DOCUMENTS

| 6,065,943 | A | * | 5/2000 | Suito et al. | .................. | 417/362 |
| 2001/0045773 | A1 | * | 11/2001 | Rutz et al. | .................. | 305/199 |
| 2006/0252592 | A1 | * | 11/2006 | Young | ........................ | 474/161 |

FOREIGN PATENT DOCUMENTS

| JP | 59-35765 | 3/1984 |
| JP | 09-264400 | 7/1997 |

OTHER PUBLICATIONS

International Standard (ISO 606: 1994(E)).
Japanese Industrial Standards (JIS B 1801-1997).

* cited by examiner

*Primary Examiner*—Robert A Siconolfi
*Assistant Examiner*—Anna Momper
(74) *Attorney, Agent, or Firm*—Howson & Howson LLP (57) ABSTRACT

In a chain transmission having a sprocket with an elastic ring sandwiched between a central hub and an annular toothed outer member, the tooth form is such that the root diameter, that is, the diameter of the tooth gap bottom circle, is greater than the root diameter in a sprocket having a standard ISO tooth form.

1 Claim, 12 Drawing Sheets

CHAIN TRANSMISSION DEVICE

CROSS-REFERENCE TO RELATED APPLICATION

This application claims priority on the basis of Japanese application 2007-014311, filed Jan. 24, 2007. The disclosure of Japanese application 2007-014311 hereby incorporated by reference.

FIELD OF THE INVENTION

The invention relates to improvements in chain transmissions, for reducing vibrations and noises generated when the rollers of a roller chain, or the bushings of a rollerless bushing chain, engage with sprocket teeth.

BACKGROUND OF THE INVENTION

Chain transmissions, in which a chain is engaged with a driving sprocket and one or more driven sprockets, have been widely used as timing transmissions in automobile engines for driving the valve-operating cam or cams from the engine crankshaft.

In these chain transmissions, it is customary to use a standard roller chain or a standard bushing chain, and a standard sprocket. The standard chains and sprockets are defined in the Japanese Industrial Standards (JIS) and in the International Standards (ISO).

Roller chains, rollerless bushing chains, and sprockets, used in chain transmissions are defined in International Standard (ISO 606: 1994(E)) and in Japanese Industrial Standards (JIS B 1801-1997). The International Standard (ISO 606: 1994 (E)) defines tooth forms of chains and sprockets (the "ISO tooth form"), and Japanese Industrial Standards (JIS B 1801-1997) define tooth forms of chains and sprockets (S-tooth forms and U-tooth forms). Both the International Standard (ISO 606: 1994(E)) and the Japanese Industrial Standards (JIS B 1801-1997) are here incorporated by reference. Copies of the relevant parts of both standards are attached. Chain transmissions generally use standard roller chains and standard sprockets, defined in ISO 606: 1994 (E) or JIS B 1801-1997.

As used herein, the term "standard chain" means a chain as defined in International Standard ISO 606: 1994 (E), or in Japanese Industrial Standards JIS B 1801-1997, and the terms "standard sprocket" and "standard tooth form" refer respectively to sprockets and sprocket teeth conforming to the ISO tooth form, or the S-tooth form or U-tooth form according to the above-mentioned Japanese Industrial Standards.

Figure 11:
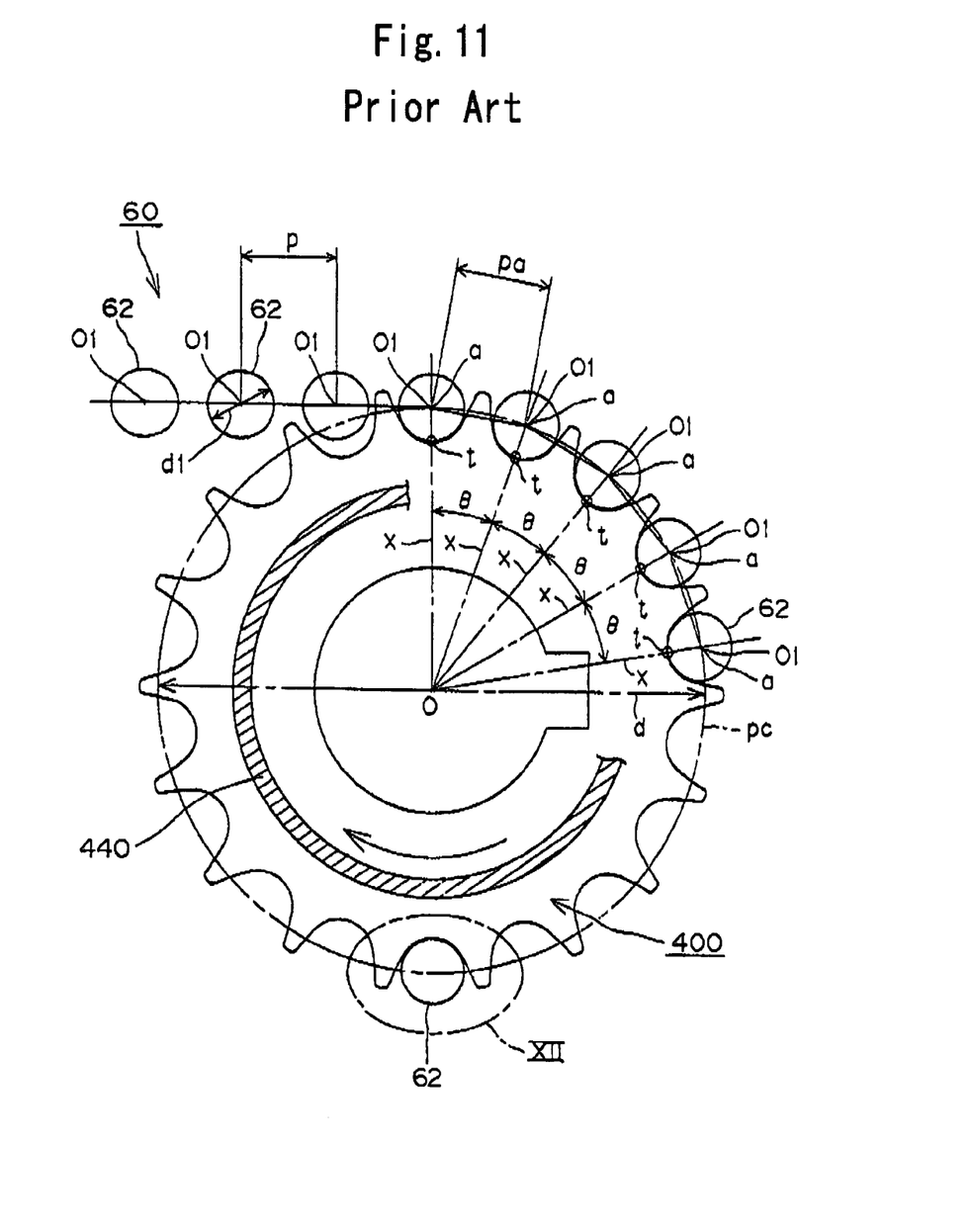
FIG. 11 is a schematic elevational view showing the conventional sprocket of FIG. 10 in mesh with a standard roller chain.
Figure 12:
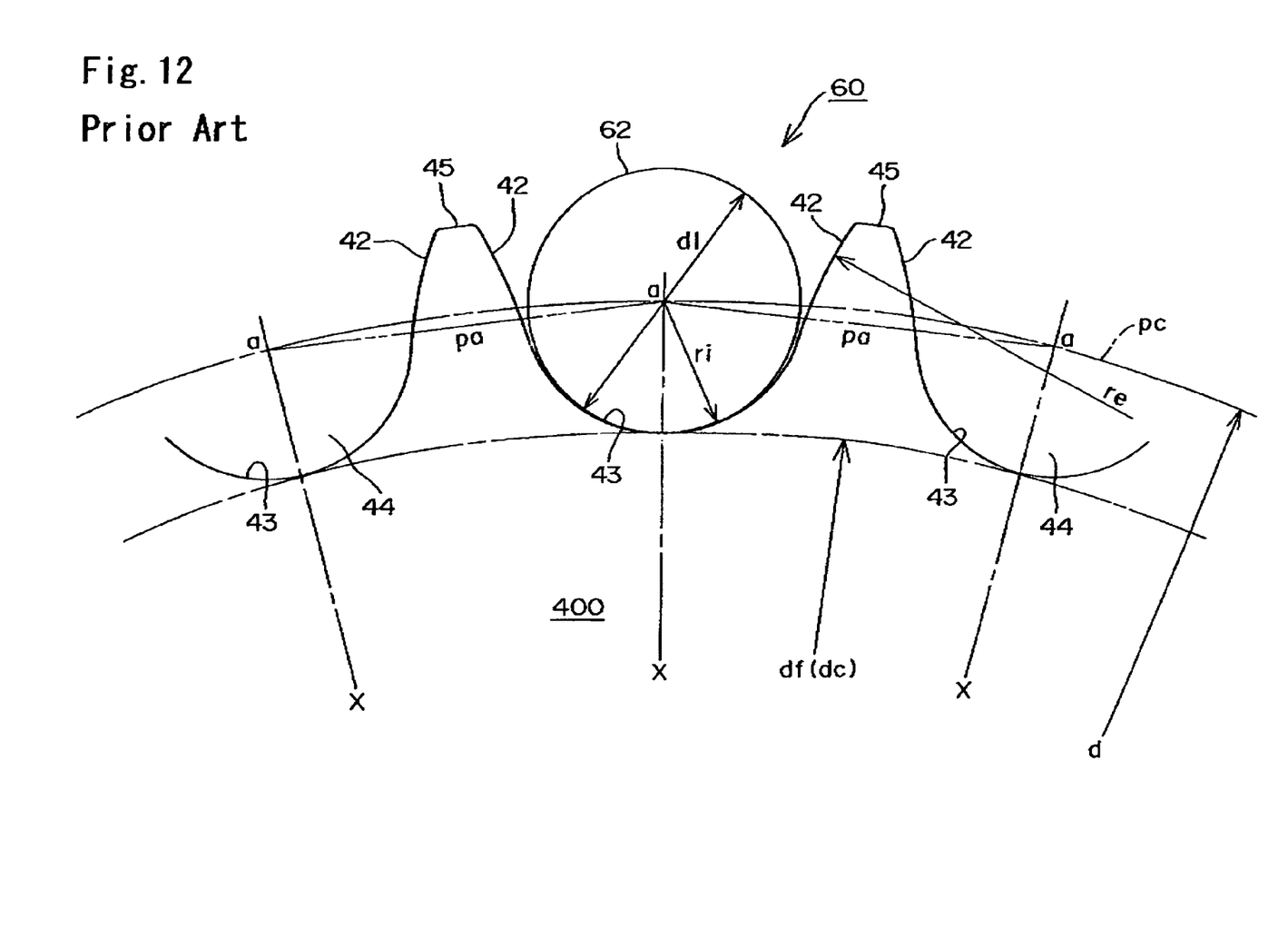
FIG. 12 is an enlarged view of a part of a conventional sprocket, designated "XII" in FIG. 11, showing details of an ISO standard tooth form.

FIGS. 11 and 12 illustrate a chain transmission comprising a sprocket 400 having an ISO tooth form, and a standard roller chain 60. FIG. 12 is an enlarged view of the portion of FIG. 11 labeled "XII". The ISO tooth forms shown in FIGS. 11 and 12 are defined by the following expressions in ISO 606: 1994(E).

$d = p/\sin(180°/z)$ $df = d - d1$ dc=df (for a sprocket having an even number of teeth)

$dc = d \cos(90°/z) - d1$ (for a sprocket having an odd number of teeth)

$re(\max) = 0.12 d1 (z+2)$ $r1(\min) = 0.505 d1$ $re(\min) = 0.008 d1 (z^2 + 180)$ $r1(\max) = 0.505 d1 + 0.069 (d1)^{1/3}$ where
p is the chain pitch,
d is the pitch circle diameter,
d1 is the roller outer diameter,
df is the diameter of the tooth gap bottom circle (root diameter),
dc is the caliper diameter of the sprocket
re (max) is the maximum value of the arc of the tooth head,
ri (min) is the minimum value of the radius of the arc of the tooth gap bottom,
re (min) is the minimum value of the arc of the tooth head,
ri (max) is the maximum value of the radius of the arc of the tooth gap bottom,
and
z is the number of sprocket teeth.

In FIGS. 11 and 12, pa is a chordal pitch of sprocket 400. This chordal pitch pa is equal to the chain pitch p of the standard roller chain 60.

As is apparent from the above expressions, in the standard sprocket 400 shown in FIG. 12, the profile of the tooth gap bottom 43 is in the form of an arc having a radius ri, which is slightly larger than the radius (d1/2) of the roller 62, and the tooth surface 42 is in the form of an arc having a radius re. Tooth surfaces 42 are continuous with the tooth gap bottom portion 43 on both sides of the tooth gap. The diameter df of the tooth gap bottom circle (also referred to as the "root diameter") is equal to the difference between the pitch circle diameter d and the roller outer diameter d1. Furthermore, the diameter df of the tooth gap bottom circle is substantially the same as the difference between the pitch circle diameter d and twice the radius ri of the arc of the tooth gap bottom.

The standard roller chain is composed of a series of inner and outer links arranged alternately. Each inner link is composed of two inner plates and two bushings. The ends of each bushing are press-fit into bushing holes in the respective inner plates. A roller, having an outer diameter d1 is rotatably fitted on the outer circumference of each bushing. Each outer link is composed of two outer link plates and two connecting pins. The ends of each connecting pin are press-fit into pin holes in the respective outer plates. The outer plates of each link are arranged in overlapping relationship with the inner plates of two inner links, and each pin of an outer link extends through a bushing of an inner link so that the inner and outer links are connected flexibly. FIG. 11 shows only the rollers 62 of the standard roller chain 60, the bushings, inner plates, inner links, connecting pins, outer plates and outer links being omitted. The standard roller chain has a uniform chain pitch p (FIG. 11), which is the distance between the centers of its successive rollers.

In the standard sprocket 400, the tooth gap bottoms and the opposed tooth surfaces 42, which are continuous with the tooth gap bottoms 43, are symmetrical with respect to center lines X of the tooth gap bottoms, each of which connects the rotational center O of the sprocket with the center of a tooth gap bottom 43. The respective center lines X intersect the pitch circle at intersection points a, and a tooth form pitch angle θ is the angle between by adjacent center lines X. Thus the angle θ of the tooth gap bottoms is an angle corresponding to the angular interval between two successive intersection points a on the pitch circle pc. Thus, the tooth form pitch angle θ is determined by the number z of teeth of the sprocket and is defined by the expression θ=360°/z. Furthermore, the tooth form pitch pa is the distance between intersection points a.

Therefore, the tooth form pitch pa is a chordal length corresponding to a tooth form pitch angle θ. Since the standard sprocket 400 has uniform tooth form pitch angles θ, the tooth form pitches pa (i.e., the chordal pitches) are arranged uniformly along the circumferential direction of the pitch circle pc. As mentioned previously, the tooth form pitch pa (i.e., the chordal pitch) is equal to the chain pitch p of the standard roller chain 60.

Recent demand for higher power automobile engines, coupled with public consciousness of environmental problems, has led to the development of engines that produce high levels of noise and vibration and to efforts toward reducing that noise and vibration. For example, in a high power engine operating at a high rotational speed, the load on the timing transmission and its contribution to the overall noise produced by the engine become significant. The principal source of timing transmission noise is the engagement sound generated as the chain engages the sprockets.

Figure 10:
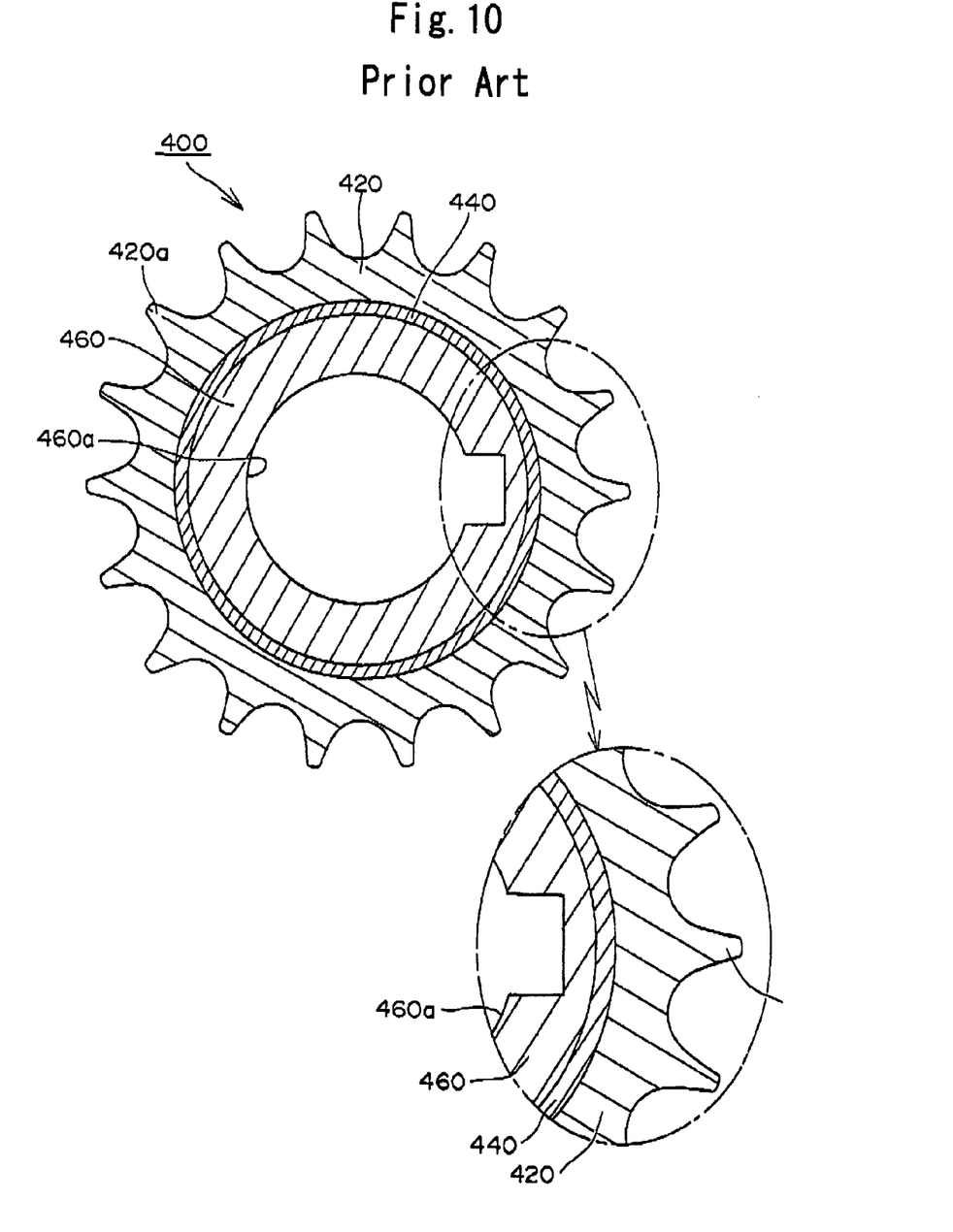
FIG. 10 is a cross-sectional view of a sprocket having a conventional vibration reducing elastic member, the figure including an enlarged auxiliary view.

A measure taken to reduction measures in engagement vibration and noise, is illustrated in FIG. 10, in which a sprocket 400 is provided with an annular elastic member 440 sandwiched between an inner circumferential hub 460 having a keyed a shaft-receiving hole 460a, and an outer circumferential member 420, which includes teeth 420a which are engageable in driving or driven relationship with a roller or bushing chain. Examples of sprockets having sandwiched elastic members are shown in Japanese Laid-Open Utility Model Publication No. Sho. 59-35765, and in Japanese Laid-Open Patent Publication No. Hei. 9-264400.

Since the sprocket 400, having an annular elastic member as shown in FIG. 10, has an ISO tooth form, when the sprocket engages with a standard roller chain 60 as shown in FIG. 11 and the sprocket rotates clockwise, a following roller 62 moves relative to the sprocket in an arc centered on the center 01 of the preceding roller 62 which has been seated on a tooth gap bottom. The arc has the chain pitch p as its radius. Accordingly, the following roller moves in its arcuate path relative to the sprocket, and collides with a tooth gap bottom, near the center thereof, substantially at a right angle. The kinetic energy of the roller is transmitted to the tooth gap bottom without being interfered at the beginning of engagement. Thus, there is a large engagement impact. The performance of the elastic member 440 in shutting out vibration has been found to be insufficient. Moreover, when the impact force is applied to the elastic member 440, the endurance of the elastic member 440 is reduced.

Further, since the chordal tooth form pitch pa of the sprocket 400 is equal to the pitch p of a standard roller chain 60, the respective following rollers 62 abut the teeth of the sprocket 400 at the same abutment position t as shown in FIG. 11. The abutment position in each case is at the point intersection of a center line X and a tooth gap bottom. Therefore, the engagement of a roller or bushing with the 400 is uniformly periodic, and vibration and noise having an order determined by the number of sprocket teeth are increased. The elastic member has been found to be incapable of reducing these noises and vibrations adequately.

The standard roller chain shown in FIG. 11 is a transmitting roller chain defined in the International standard (ISO), and has a uniform chain pitch p (The distance between the centers 01 of the respective rollers 62). A standard bushing chain may be used in place of the standard roller chain 60. In such a case, the elements 62 in FIG. 11 can be regarded as bushings.

Accordingly, an object of the invention is to provide a chain transmission in which a roller of a standard roller chain or a bushing of a standard bushing chain engages with a sprocket tooth, in which the vibration reducing performance of an elastic member incorporated into the sprocket is improved, and in which the endurance of the elastic member is improved.

SUMMARY OF THE INVENTION

The chain transmission in accordance with the invention comprises a sprocket having sprocket teeth separated by tooth gaps having tooth gap bottoms, and a standard roller or bushing chain engaged with the sprocket teeth. The sprocket has a hub, an annular peripheral part on which the sprocket teeth are formed, and an annular elastic member disposed between, and concentric with, the hub and the annular peripheral part. The tooth gap bottoms are tangent to a tooth gap bottom circle concentric with the hub, the elastic member, and the annular peripheral part, and the diameter of the tooth gap bottom circle is larger than the diameter of the tooth gap bottom circle of a standard sprocket designed to be engaged by said standard roller or bushing chain.

With the above-defined sprocket configuration a roller of a standard roller chain approaching the sprocket first abuts the back surface of a sprocket tooth at the start of engagement. The roller abuts the back surface of the sprocket tooth in a substantially tangential direction, and consequently, impact due to relative movement is reduced, and the engagement impact between the roller or bushing and the tooth gap bottom of the sprocket is decreased. The vibration-reducing performance of the elastic member is improved, and, since the impact force applied to the elastic member is reduced, its endurance is improved.

Furthermore, the timing of engagement of a roller or bushing with the sprocket is also shifted. Consequently vibrations and noises having an order determined by the number of sprocket teeth, which could not be reduced by the elastic member alone, are reduced. Thus, the overall sounds produced by the chain transmission are significantly reduced by the combined effect of the shift in engagement timing and the vibration-reduction achieved by the elastic member.

DETAILED DESCRIPTION OF THE PREFERRED EMBODIMENTS

The several embodiments of the invention which will be described have in common the fact that the sprocket has an annular elastic member disposed between, and concentric with, a hub and an annular peripheral part on which the sprocket teeth are formed, and the fact that the tooth gap bottom circle is larger than the diameter of the tooth gap bottom circle of a standard sprocket designed to be engaged by a standard roller or bushing chain.

Figure 1:
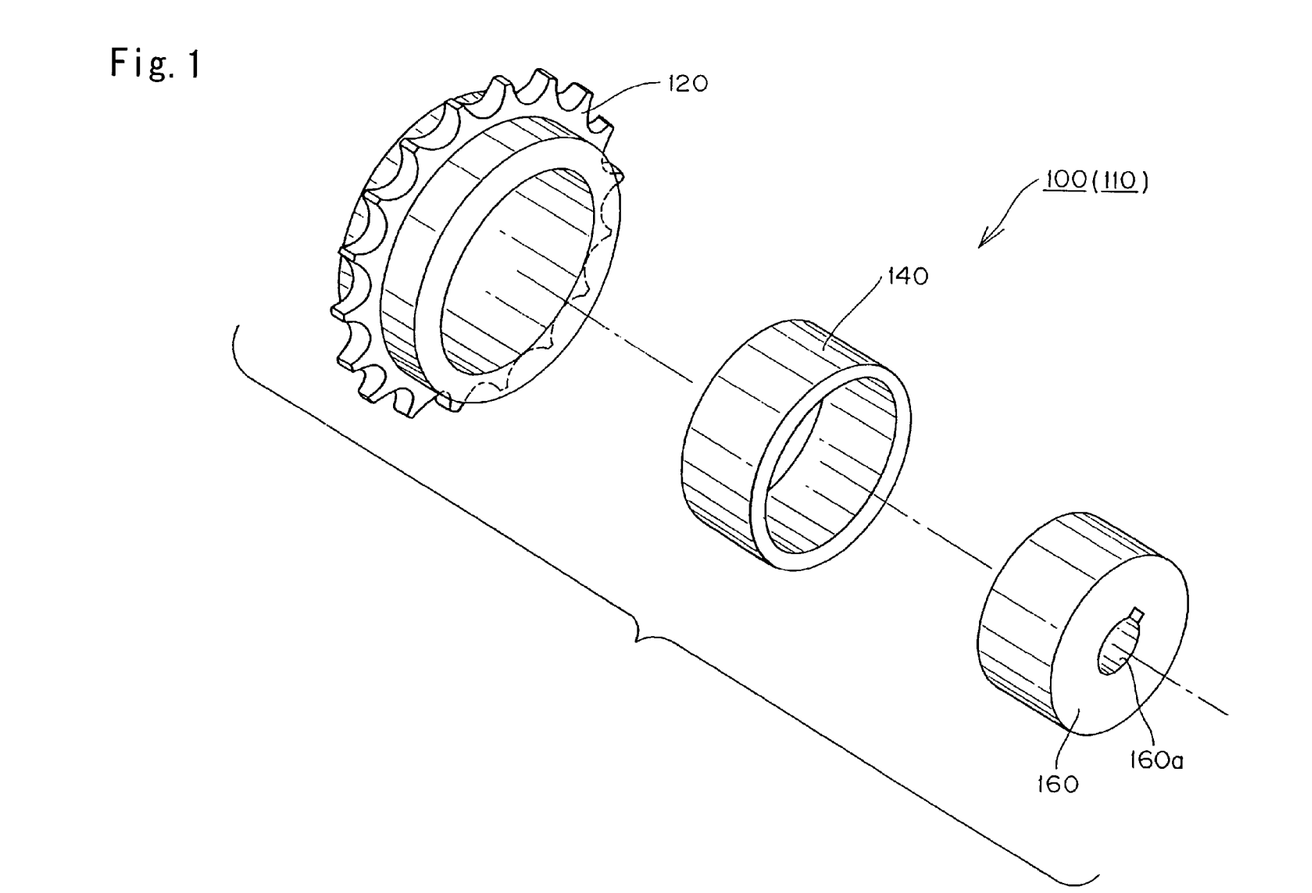
FIG. 1 is an exploded perspective view of a first embodiment of a sprocket according to the invention.
Figures 2A, 2B:
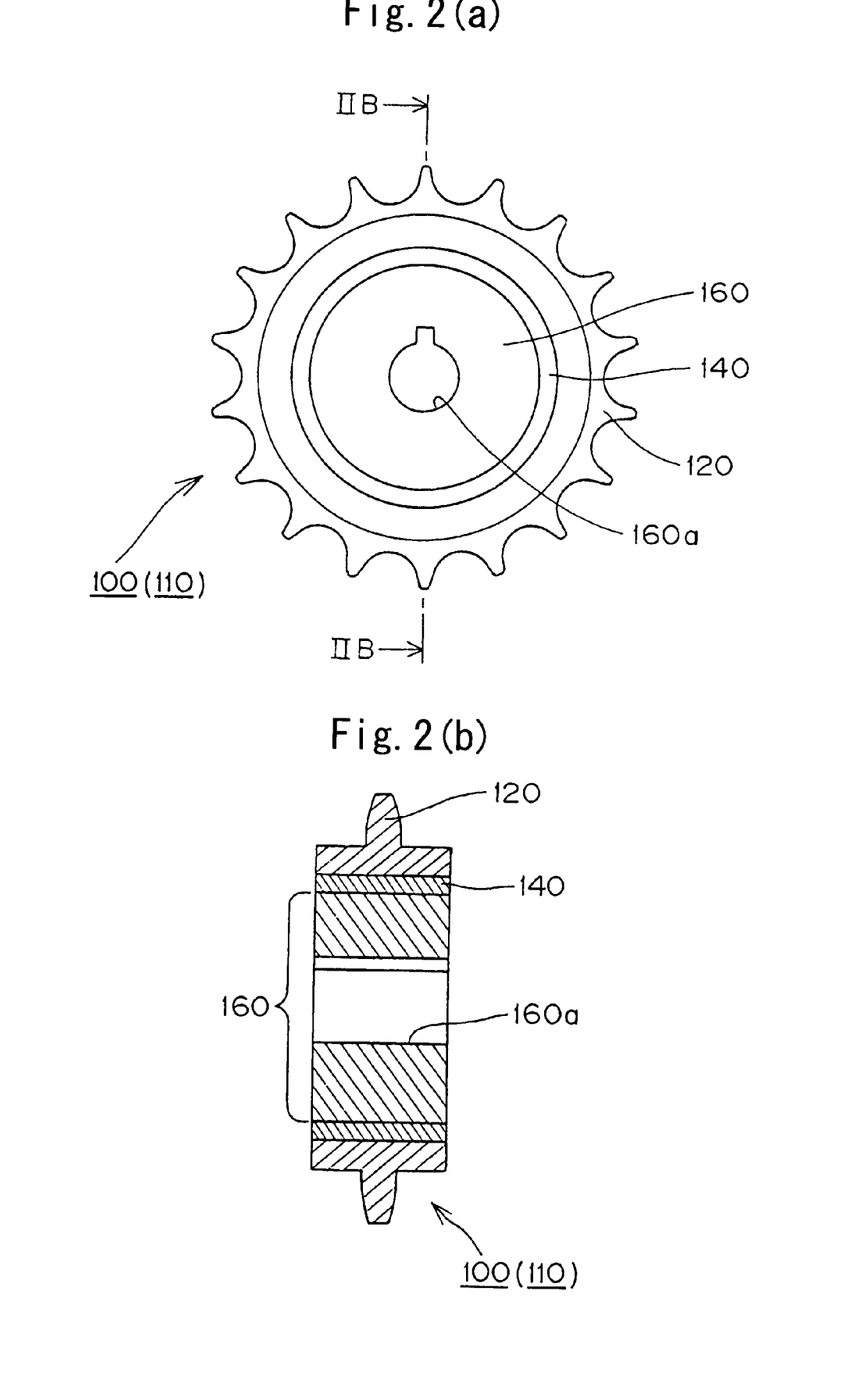
FIG. 2(a) is a front elevational view of the sprocket shown in FIG. 1.
FIG. 2(b) is a cross-sectional view taken on section plane IIB-IIB in FIG. 2(a)

As shown in FIGS. 1 and 2, in a first embodiment of the invention, an elastic member 140 is attached to an inner hub 160 of the sprocket. The hub includes a keyed shaft-receiving hole 160a to which a shaft can be fitted. An outer circumferential member 120, on which the sprocket teeth are formed, surrounds the elastic member 140. The elastic material can be resin, rubber, metal or the like, but the material of the elastic member should have a Young's modulus smaller than that of the outer circumferential member 120.

Figure 8:
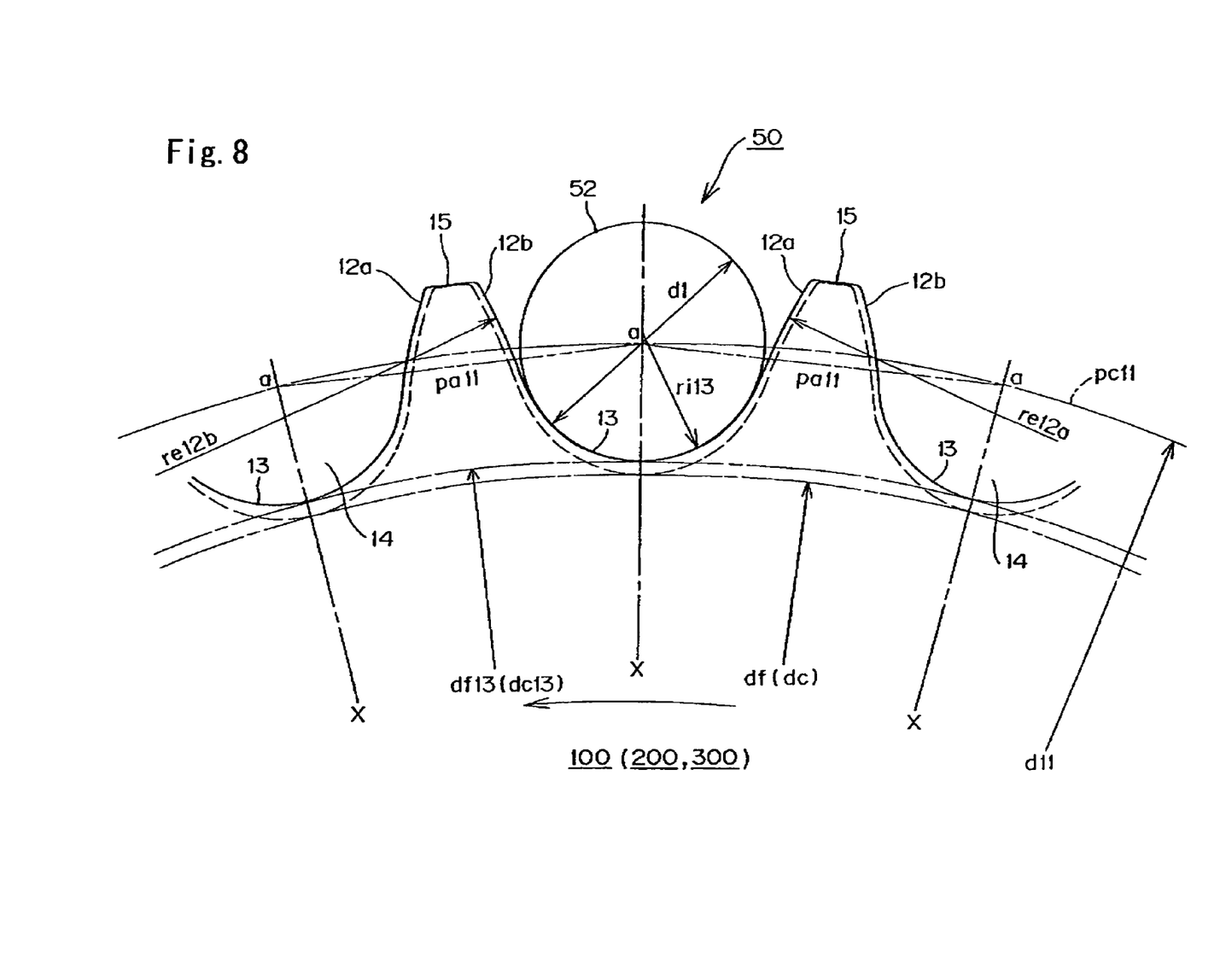
FIG. 8 is an enlarged view of apart of a sprocket according to the invention, showing details of the sprocket tooth form.

The sprocket 100 has a tooth form, shown in FIG. 8, which is different from the standard ISO tooth form as shown in FIG. 12 and as represented by the broken line in FIG. 8. Referring to FIG. 8, in the sprocket 100, the sprocket teeth 15 are separated by tooth gaps or grooves 14. The adjacent teeth have facing tooth surface 12a and 12b, which are continuous with a tooth gap bottom 13.

The tooth surface 12a of the sprocket 100 is a front surface with reference to the direction of rotation of the sprocket and the tooth surface 12b is a back surface of the tooth. Facing surfaces 12a and 12b are symmetrical with respect to a center line X of the tooth gap bottom between them, the center line extending from a rotational center of the sprocket through the center of a tooth gap bottom thereof. The tooth surface 12a and 12b are in the form of convex arcs. The arcs forming the tooth surfaces 12a and 12b are have radii re12a and re12b as shown in FIG. 8, and these radii are larger than the radius re (FIG. 12) of an arcuate tooth surface in accordance with the ISO standard. That is, re12a>re and re12b>re. The tooth surfaces 12a and 12b are smoothly continuous with the tooth gap bottom 13.

The tooth gap bottom 13 is in the form of an arc having its center on the center line X of the tooth gap bottom. The arc forming the tooth gap bottom 13 has a radius ri13, which is larger than the radius ri of the arc-shaped tooth gap bottom in the standard ISO tooth form, as shown in FIG. 11. Thus, ri13>ri. The radius ri is one half the diameter d1 of the roller or the standard roller chain (or the bushing of the standard bushing chain) The center of the arc having radius ri13 is on the center line X, and positioned radially outward relative to the center of the arc of the tooth gap bottom of the ISO tooth form.

When the number z of sprocket teeth is even, the root diameter df13 (that is, the diameter of the tooth gap bottom circle) is larger than the root diameter df of the ISO tooth form. That is df13>df. Furthermore, when the number of sprocket teeth is odd, the caliper diameter dc13 is larger than the caliper diameter dc of the ISO tooth form. That is, dc13>dc.

Because the root diameter df13 is greater than the root diameter df, or the caliper diameter dc13 is greater than the caliper diameter dc, the chordal pitch pa11 of the sprocket 100 (the distance between successive intersection points a between a pitch circle pc11 and the center lines X of the tooth gap bottoms) is larger than the chordal pitch pa of the standard sprocket as shown in see FIGS. 11 and 12). That is, pa11>pa.

The chordal pitch pa of a standard sprocket having an ISO tooth form is equal to the chain pitch p of a standard roller chain 50 (that is, the distance between the centers of its rollers 52). On the other hand, the chordal pitch pa11 of the sprocket 11a according to the invention is larger than the chain pitch p of the standard roller chain 50. That is, pa11>p.

Figure 3:
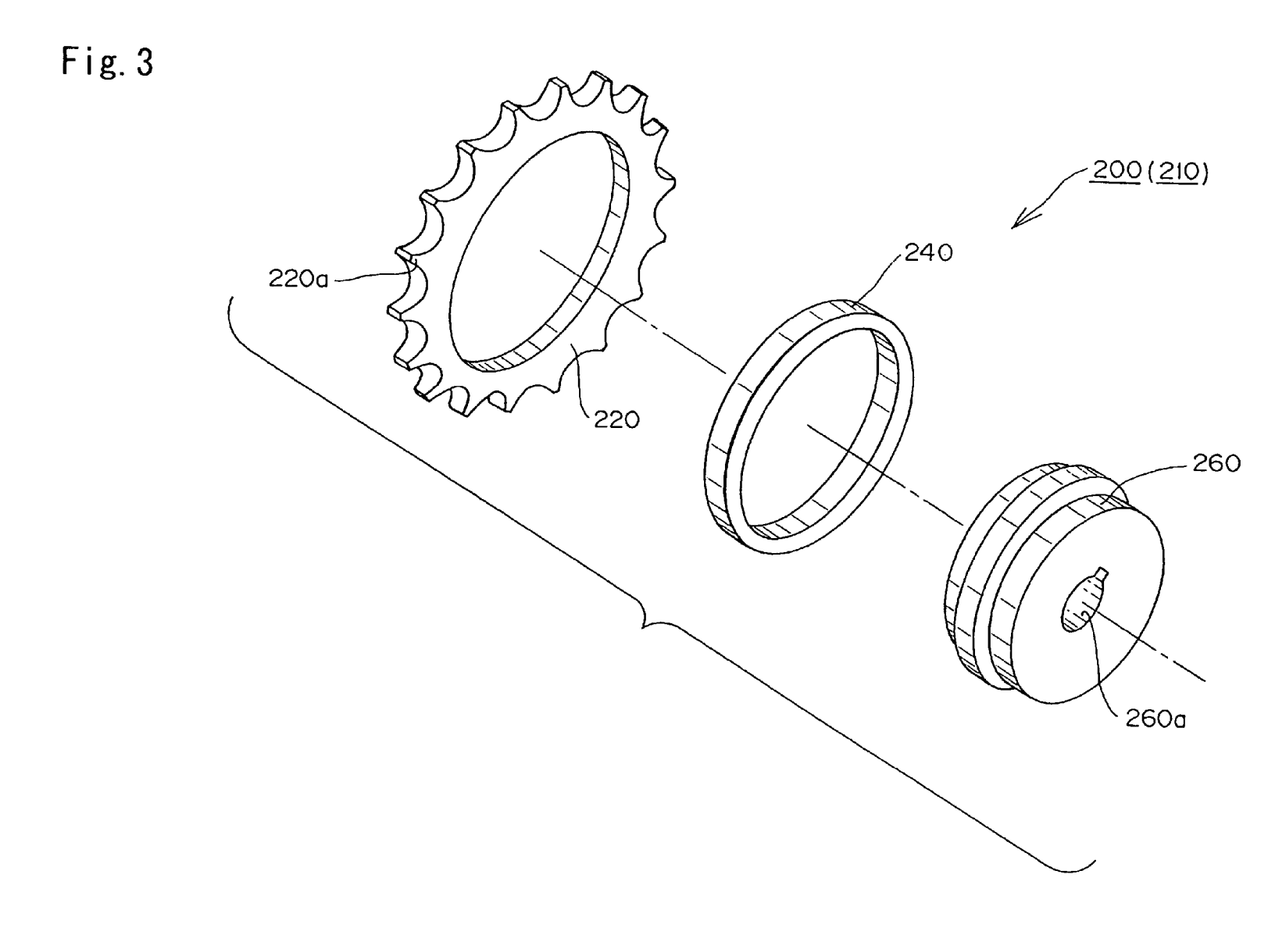
FIG. 3 an exploded perspective view of another embodiment of a sprocket according to the invention.
Figure 4A:
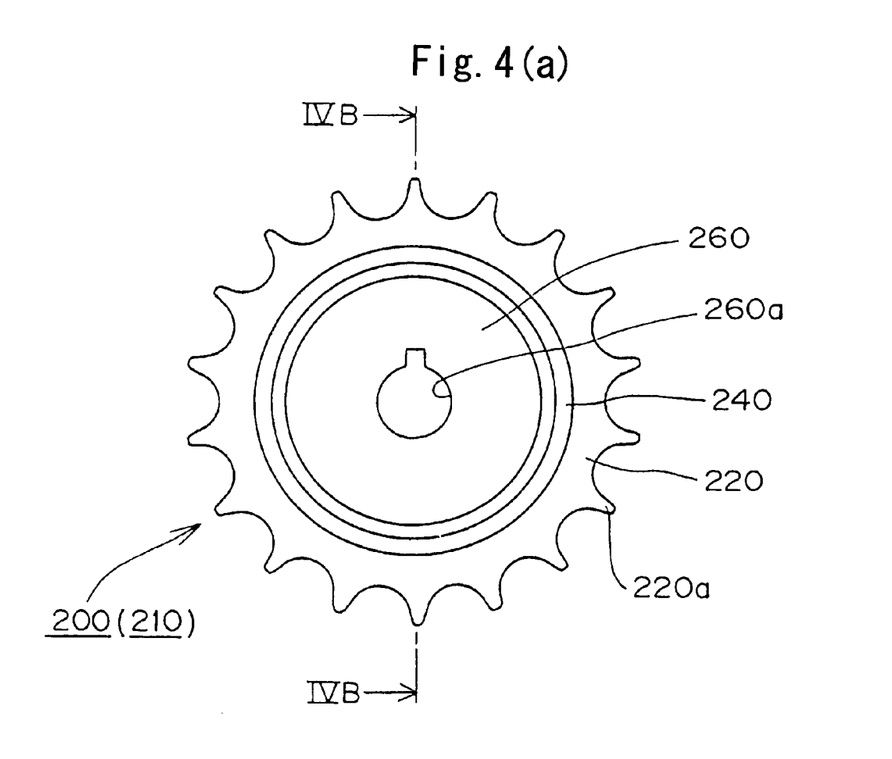
FIG. 4(a) is a front elevational view of the sprocket shown in FIG. 3.
Figure 4B:
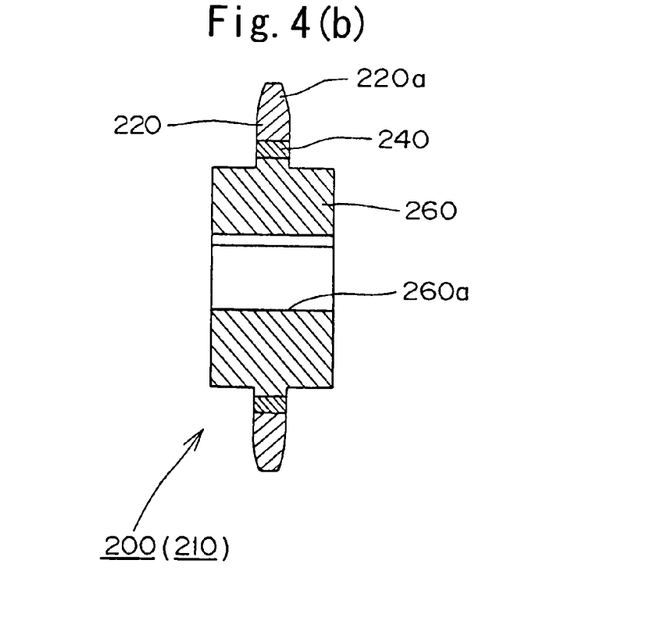
FIG. 4(b) is a cross-sectional view taken on section plane IVB-IVB in FIG. 4(a)

A chain transmission according to a second embodiment of the invention is shown in FIGS. 3, 4(a) and 4(b), and its sprocket tooth form is as illustrated in FIG. 8. An outer circumferential member 220, on which the sprocket teeth 220a are formed, surrounds an elastic member 240. The elastic material can be resin, rubber, metal or the like, but the material of the elastic member should have a Young's modulus lower than that of the outer circumferential member 220.

The sprocket has a tooth form as shown in FIG. 8, which is different from the standard ISO tooth form. The root diameter (i.e., the diameter of the tooth gap bottom circle) is greater than the root diameter of the standard ISO tooth form, and, in the case of a sprocket having an odd number of teeth, the caliper diameter is also greater than the caliper diameter of the ISO tooth form. The details of the sprocket 200 are the same as in the first embodiment and are illustrated in FIG. 8.

Figure 5:
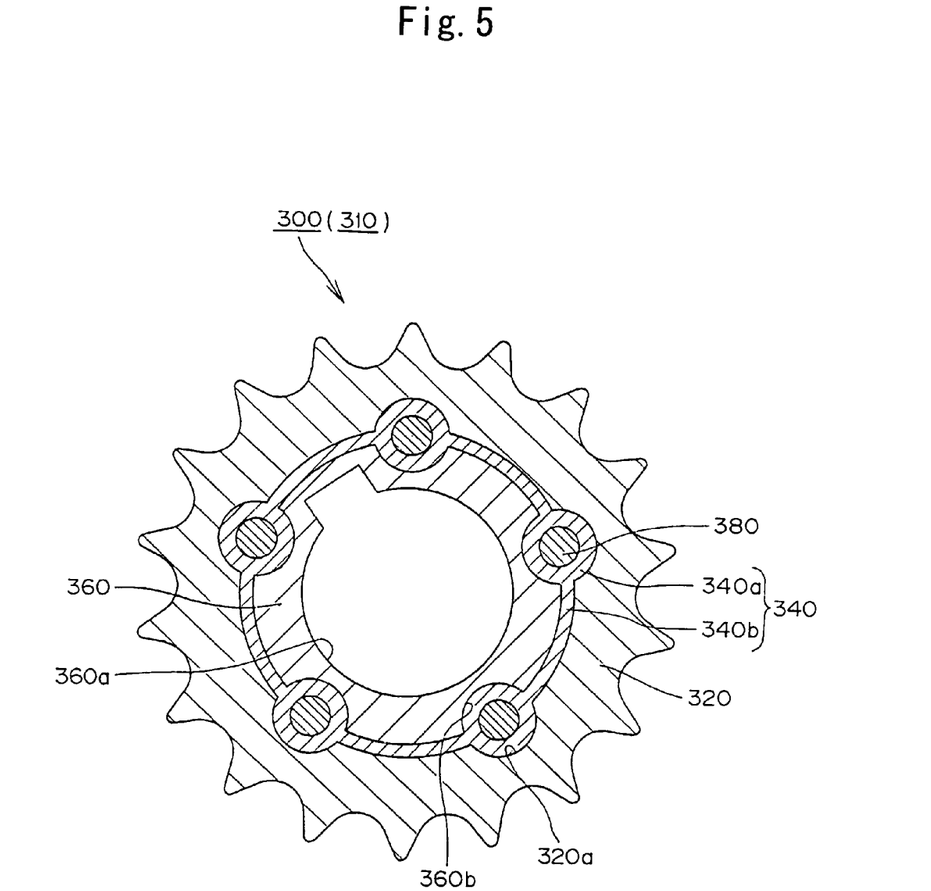
FIG. 5 is cross-sectional view of a sprocket according to still another embodiment of the invention.
Figure 6:
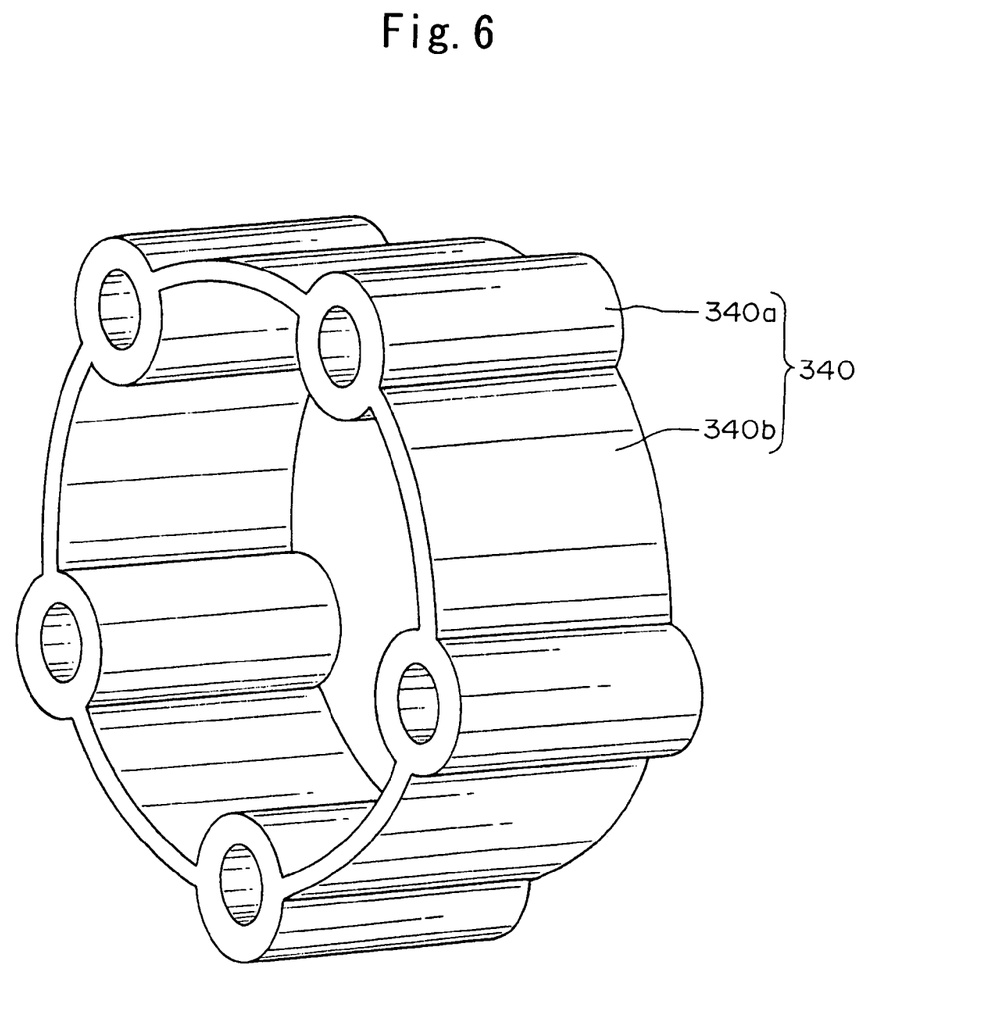
FIG. 6 is a perspective view of an elastic member in the sprocket shown in FIG. 5.

In a sprocket according to a third embodiment of the invention, as shown in FIGS. 5 and 6, an elastic member 340 is sandwiched between an inner circumferential hub 360 and an outer circumferential member 320 on which sprocket teeth are formed. The hub has a keyed shaft hole 360a to which a shaft can be fitted. The elastic member 340 is composed of a material such as resin, rubber, metal, or the like, having a Young's modulus lower than that of the outer circumferential member 320.

The elastic member 340 is formed with a plurality of spaced cylindrical portions 340a, disposed at equal intervals around the circumference of the elastic member. The cylindrical members are connected by arc-shaped plates 340b. The elastic member 340 is sandwiched between the outer circumferential surface of the inner circumferential hub 360 and an inner circumferential surface of the toothed outer circumferential member 320. The cylindrical portions 340a are fitted between opposed concave grooves 360b and 320a respectively disposed on the outer circumferential surface of the inner circumferential hub 360 and the inner circumferential surface of the toothed outer circumferential member 320 at uniform intervals. Center pins 380 are fitted into and secured to hollow central openings in the cylindrical portions 340a of the elastic members. The pins 380 are preferably formed of a material having a higher rigidity than that of the elastic member 340.

Since the cylindrical portions 340a of the elastic member are disposed at equal intervals in the circumferential direction, the outer circumferential member 320 and the inner circumferential member 360 are prevented from sliding circumferentially relative to the elastic member 340 and from rotating relative to each other. Thus, the elastic member is prevented from being sheared by relative rotation of the inner circumferential surface of the outer circumferential member 320 and the outer circumferential surface of the inner circumferential hub 360 of the sprocket 300.

The sprocket of FIG. 5 has a tooth form corresponding to the tooth form shown in FIG. 8, which is different from the standard ISO tooth form. The root diameter (i.e., the diameter of the tooth gap bottom circle) is greater than the root diameter of the standard ISO tooth form, and, in the case of a sprocket having an odd number of teeth, the caliper diameter is also greater than the caliper diameter of the ISO tooth form. The details of the sprocket 300 are the same as in the first and second embodiments.

Figure 9:
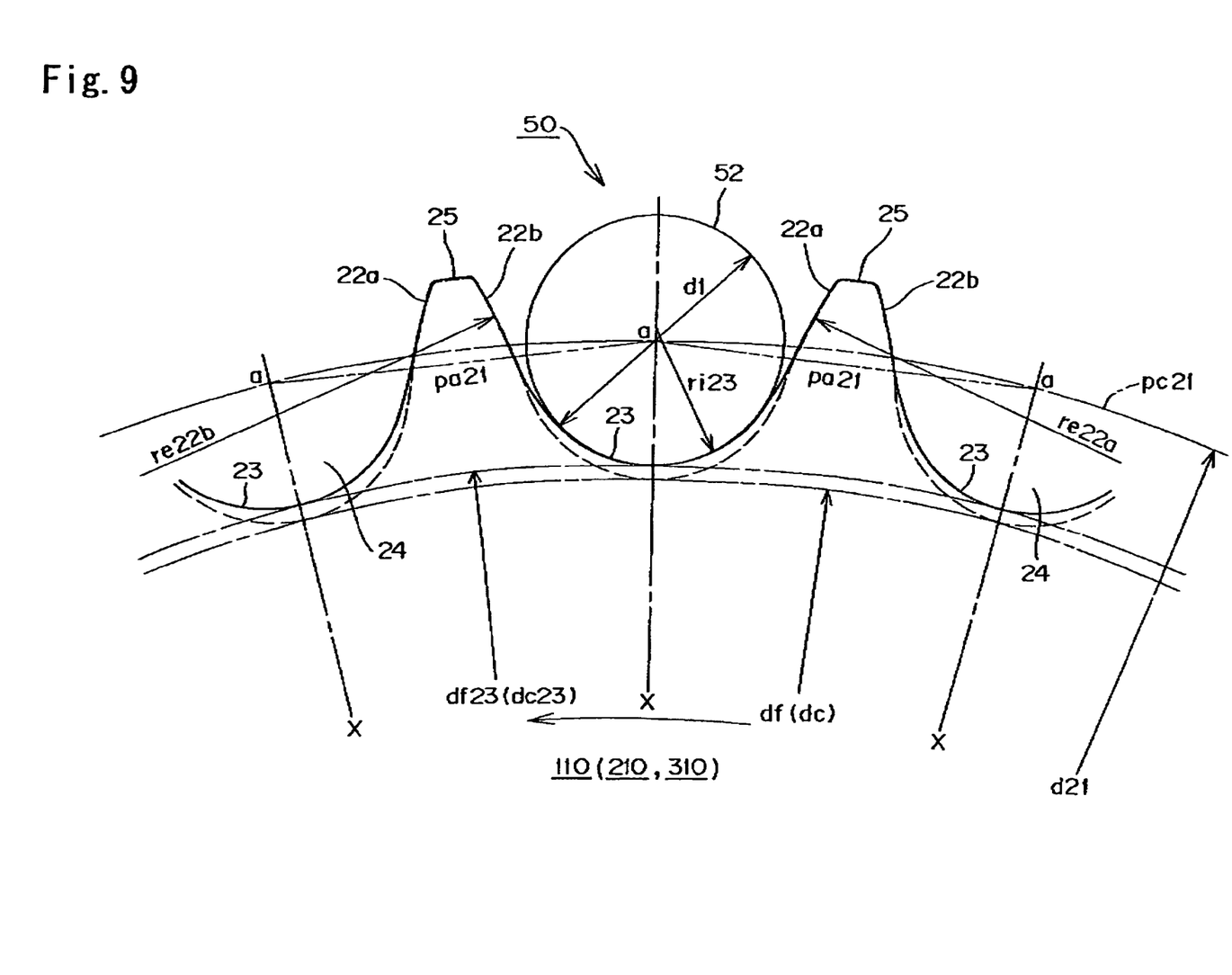
FIG. 9 is an enlarged view of a part of another sprocket according to the invention, showing details of the sprocket tooth form.

In a fourth embodiment of the invention, the sprocket is configured as shown in FIGS. 1 and 2, and has a sprocket tooth form as shown in FIG. 9.

The shape, function, and material of the elastic member forming a sprocket of the fourth embodiment are the same as the first embodiment. The tooth form, however, is different from the tooth form illustrated in FIG. 8. As shown in FIG. 9, the sprocket a plurality of teeth 25, separated by tooth gaps or grooves 24. Adjacent teeth have facing tooth surfaces 22a and 22b, which are continuous with tooth gap bottoms 23. As in FIG. 8, the standard ISO tooth form is illustrated by broken lines.

In sprocket 100, as shown in FIG. 9, tooth surfaces 22a are front surfaces with reference to the direction of rotation of the sprocket and tooth surfaces 22b are back surfaces. These front and back surfaces are symmetrical formed with respect to the center line X of the tooth gap between them, the center lines extending from a rotational center of the sprocket through to the centers of the tooth gap bottoms. The tooth surface 22a and 22b are respectively in the form of convex arcs having identical radii re22a and re22b, which are the same as the radius re of the arcuate tooth surface of the ISO tooth form, as shown in FIG. 12. That is, re22a=re and re22b=re. The tooth surfaces 22a and 22b are smoothly continuous with the tooth gap bottom 23.

Each tooth gap bottom 23 is in the form of an arc having its center on the center line X of the tooth gap bottom. The arc forming the tooth gap bottom 23 has a radius ri23, which is larger than the radius ri of the arcuate tooth gap bottom in an ISO tooth form. That is ri23>ri. The center of the arc of the tooth gap bottom in the fourth embodiment is positioned radially outward with respect to the center of the arc the tooth gap bottom of the ISO tooth form.

As in the previously described embodiments, the root diameter df23 (i.e., the diameter of the tooth gap bottom circle) is greater than the root diameter df of the standard ISO tooth form. That is df 23>df. Moreover, in the case of a sprocket having an odd number of teeth, the caliper diameter dc23 is also greater than the caliper diameter dc of the ISO tooth form. That is, dc23>dc. The chordal pitch pa21 of the sprocket 110 (that is, the distance between intersection points of the pitch circle and radial center lines X of adjacent tooth gaps) is larger than the chordal pitch pa of the standard sprocket as in FIGS. 11 and 12. That is, pa21>pa.

Whereas the chordal pitch pa of a standard sprocket is equal to a chain pitch p of a standard roller chain, the chordal pitch pa21 of the sprocket 110 in FIG. 9 is larger than the chain pitch p of the standard roller chain 50. That is, pa21>p.

In a fifth embodiment of the invention, the sprocket corresponds to the sprocket shown in FIGS. 3, 4(a) and 4(b), and the tooth form corresponds to the tooth form shown in FIG. 9.

The shape, function, and material of the elastic member in the sprocket of the fifth embodiment are the same as the elastic member 240 in the second embodiment as shown in FIGS. 3 and 4.

As in the previously described embodiments, the root diameter df23 is greater than the root diameter df of the standard ISO tooth form, and other details of the sprocket of the fifth embodiment are similar to those of the fourth embodiment.

In a sixth embodiment of the invention, the sprocket corresponds to the sprocket of FIGS. 5 and 6, and the tooth form corresponds to the tooth form shown in FIG. 9.

The shape, functions and material of the elastic member forming the sprocket 310 in accordance with the sixth embodiment are the same as those of the elastic member 340 in the third embodiment.

Here, as in the previously described embodiments, the root diameter and the caliper diameter (in the case of a sprocket having an odd number of teeth) are greater respectively than the root diameter and caliper diameter of a standard ISO sprocket In the first, second, fourth and fifth embodiments, the elastic members 140 and 240 have a cylindrical shape and a uniform thickness. Since the shape of the tooth form is different from that of the standard ISO tooth form, the magnitude of impact generated on engagement is different. If the thickness of the elastic material near a tooth which receives a large impact is increased, the absorption of impact and reduction of vibration can be improved.

Figure 7:
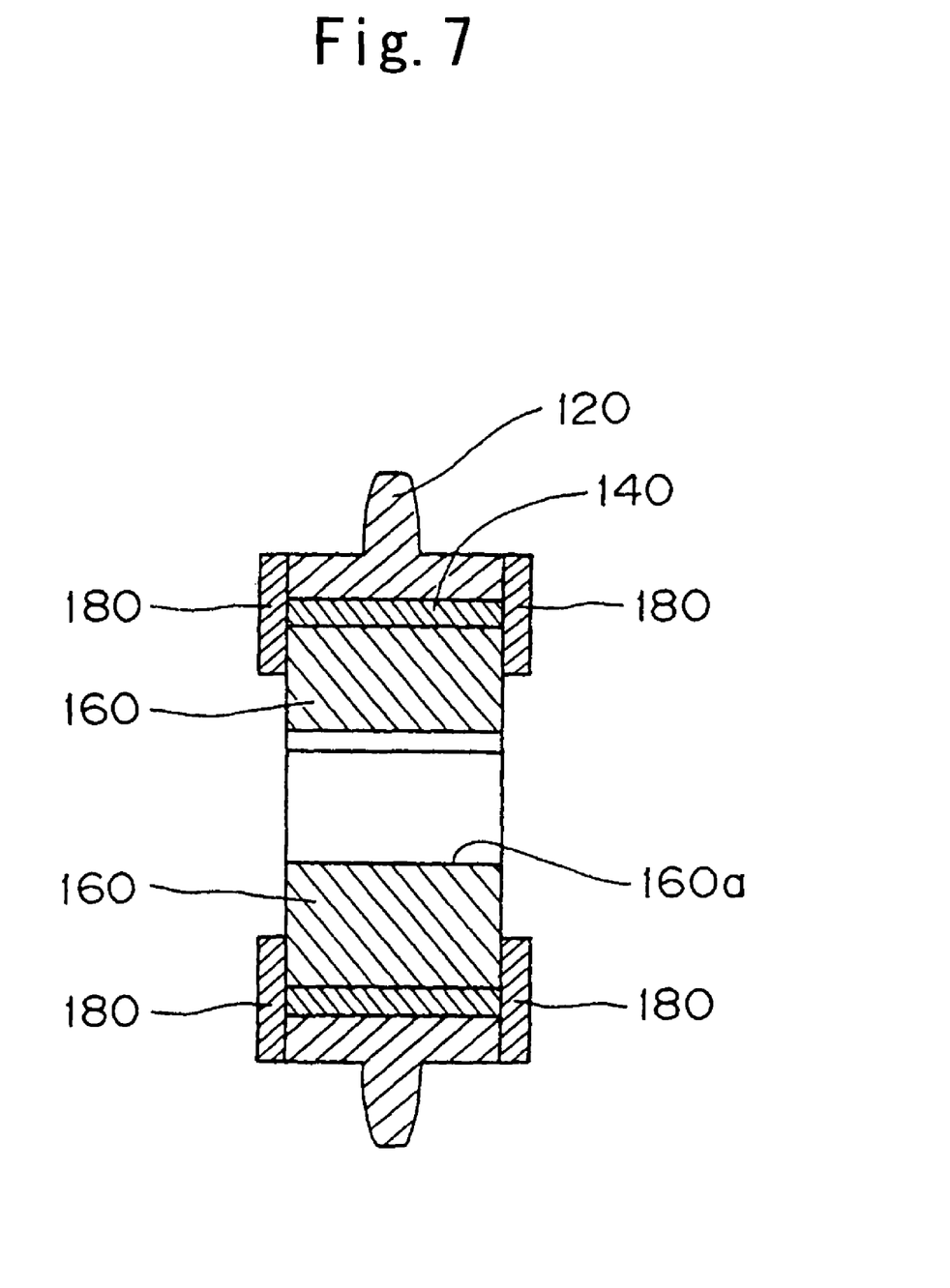
FIG. 7 is a cross-sectional view of a sprocket similar to the sprocket of FIGS. 1, 2(a) and 2(b), but having attached ring members.

In each of the above-described embodiments, the elastic members 140, 240 and 340 are attached to the outer circumferential members 120, 220, 320 of the sprocket and to the inner circumferential hubs 160, 260, 360, or sandwiched between outer circumferential member and the hub. As shown in FIG. 7, wherein the sprocket is similar to that of FIGS. 1, 2(a) and 2(b), ring members 180 are provided on both sides of the elastic member 140 to prevent the toothed outer circumferential member portion from becoming disengaged from the hub in the event of breakage of the elastic material.

Although in each embodiment of the invention described above, a standard roller chain is used, the advantages of the invention can be realized where a standard bushing chain is used, in which case bushings, instead of rollers, engage with the teeth of the sprocket. Furthermore, although two particular tooth forms are shown in FIGS. 8 and 9, if the sprocket tooth form satisfies the condition that its root diameter or caliper diameter is larger than a root diameter or caliper diameter of the standard sprocket, even if the tooth form is the same as that of a standard sprocket, the beneficial effects of the invention can be obtained. The maximum outer diameter of the tooth forms in all embodiments of the invention should be selected for compatibility with a chain transmission using a conventional standard sprocket.

The chain transmission of the invention takes advantage of the vibration-reducing performance of the elastic member incorporated into the sprocket, and the endurance of the elastic member is improved. Moreover, vibration and noise, having an order corresponding to the number of sprocket teeth, are reduced, and the overall sound generated by the transmission is significantly reduced.

What is claimed is:

1. A chain transmission comprising:
    a sprocket having sprocket teeth separated by tooth gaps having tooth gap bottoms; and
    a roller or bushing chain engaged with the sprocket teeth;
        wherein the sprocket has a hub having an outer circumferential surface, an annular peripheral part on which the sprocket teeth are formed, said annular peripheral part having an inner circumferential surface, and an annular elastic member sandwiched between, and concentric with, the hub and the annular peripheral part;

wherein the elastic member is formed with a plurality of circumferentially spaced cylindrical portions and said cylindrical portions are connected by arc shaped parts and fit into opposed concave grooves formed in the outer circumferential surface of the hub and the inner circumferential surface of the annular peripheral part;

wherein the tooth gap bottoms are tangent to a tooth gap bottom circle concentric with the hub, the elastic member, and the annular peripheral part;

wherein the diameter of the tooth gap bottom circle is larger than the diameter df of a tooth gap bottom circle of a sprocket engaged by said roller or bushing chain and conforming to the formulae:

$d = p/\sin(180°/z)$ $df = d - d1$ d=df (for a sprocket having an even number of teeth $dc = d\cos(90°/z) - d1$ (for a sprocket having an odd number of teeth)

$re(\max) = 0.12 d1 (z+2)$ $r1(\min) = 0.505 d1$ $re(\min) = 0.008 d1 (z2 + 180)$ $r1(\max) = 0.505 d1 + 0.069 (d1)^{1/3}$ where
- p is the chain pitch,
- d is the pitch circle diameter,
- d1 is the roller outer diameter,
- df is the diameter of the tooth gap bottom circle (root diameter),
- dc is the caliper diameter of the sprocket
- re (max) is the maximum value of the arc of the tooth head,
- ri (min) is the minimum value of the radius of the arc of the tooth gap bottom,
- re (min) is the minimum value of the arc of the tooth head,
- ri (max) is the maximum value of the radius of the arc of the tooth gap bottom, and
- z is the number of sprocket teeth; and wherein each of said circumferentially spaced cylindrical portions is formed with a hollow central opening, and in which a pin, formed of a material having a higher rigidity than that of the elastic member is fitted into each said hollow central opening.

\* \* \* \* \*

UNITED STATES PATENT AND TRADEMARK OFFICE
CERTIFICATE OF CORRECTION

PATENT NO. : 7,713,156 B2
APPLICATION NO. : 11/999450
DATED : May 11, 2010
INVENTOR(S) : Shunji Sakura and Akira Hirai It is certified that error appears in the above-identified patent and that said Letters Patent is hereby corrected as shown below:

Col. 5, line 60, replace "bushing chain)" with -- bushing chain). --;

Col. 9, line 19, Claim 1, replace "d=df" with -- dc=df --;

Col. 9, line 23, Claim 1, replace "member" with -- member, --.

Signed and Sealed this

Ninth Day of November, 2010

David J. Kappos
*Director of the United States Patent and Trademark Office*